United States Patent
Li et al.

(10) Patent No.: US 11,290,945 B2
(45) Date of Patent: Mar. 29, 2022

(54) METHODS, APPARATUS AND SYSTEMS FOR INDICATING A CONFIGURATION OF ACCESS CONTROL INFORMATION IN A WIRELESS COMMUNICATION

(71) Applicant: ZTE CORPORATION, Guangdong (CN)

(72) Inventors: Dapeng Li, Guangdong (CN); Qian Dai, Guangdong (CN); Wenting Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 25 days.

(21) Appl. No.: 16/911,025

(22) Filed: Jun. 24, 2020

(65) Prior Publication Data
US 2020/0322877 A1 Oct. 8, 2020

Related U.S. Application Data

(63) Continuation of application No. PCT/CN2018/076395, filed on Feb. 13, 2018.

(51) Int. Cl.
*H04W 48/12* (2009.01)
*H04W 48/14* (2009.01)

(52) U.S. Cl.
CPC .................. *H04W 48/12* (2013.01)

(58) Field of Classification Search
None
See application file for complete search history.

(56) References Cited

U.S. PATENT DOCUMENTS

| 9,642,068 B2* | 5/2017 | Chen | H04W 48/10 |
| 2014/0162649 A1 | 6/2014 | Cui et al. | |
| 2020/0084799 A1* | 3/2020 | Jiang | H04W 88/08 |

FOREIGN PATENT DOCUMENTS

| CN | 101925151 A | 12/2010 |
| CN | 102118833 A | 7/2011 |
| CN | 102404820 A | 4/2012 |
| CN | 102740492 A | 10/2012 |
| CN | 103024922 A | 4/2013 |
| CN | 105163365 A | 12/2015 |
| CN | 106068633 A | 11/2016 |
| CN | 106937354 A | 7/2017 |
| CN | 107223351 A | 9/2017 |
| CN | 111492693 A | 1/2018 |
| CN | 109451838 A | 3/2019 |

(Continued)

OTHER PUBLICATIONS

ZTE, Sane chips "Consideration on the access control in NR" 3GPP TSG-RAN WG2 Meeting#99bis R2-1710424, Prague, Czech Republic, Oct. 13, 2017, 6 pages.

(Continued)

*Primary Examiner* — Hong S Cho
(74) *Attorney, Agent, or Firm* — Duane Morris LLP

(57) ABSTRACT

Methods, apparatus and systems for indicating a configuration of access control information in a wireless communication are disclosed. In one embodiment, a method performed by a wireless communication node is disclosed. The method comprises: transmitting an indicator to at least one wireless communication device. The indicator indicates a configuration of access control information related to the at least one wireless communication device.

18 Claims, 11 Drawing Sheets

(56) References Cited

FOREIGN PATENT DOCUMENTS

| WO | 2013171256 A1 | 11/2013 |
| WO | 2016027133 A1 | 2/2016 |
| WO | 2016107002 A1 | 7/2016 |
| WO | 2017051213 A1 | 3/2017 |

OTHER PUBLICATIONS

Samsung, "Some SIB1 contents and clean-up of Section 7.3 in Stage-2" 3GPP TSG-RAN WG2 100 Meeting Tdoc R2-1713433, Reno, USA, Dec. 1, 2017, 4 pages.

Ericsson, "Access Control for NR" 3GPP TSG-RAN WG2 #97 Tdoc R2-1700911, Athens, Greece, Feb. 17, 2017, 5 pages.

CATT, "Access control for MTC" 3GPP TSG RAN WG2 Meeting #71 bis R2-105388, Xi'an, China, Oct. 15, 2010, 4 pages.

ZTE, "Consideration on the barring parameters" 3GPP TSG RAN WG2 NR Ad Hoc 1801 R2-1800459, Vancouver, Canada, Jan. 11, 2018, 6 pages.

ZTE, "Consideration on the signaling of barring parameters" 3GPP TSG RAN WG2 Meeting #102 R2-1807316, Busan, Korea, May 21-25, 2018, 6 pages.

Spreadtrum Communications, "Barring information encoding for 5G unified access control" 3GPP TSG-RAN NG2 NR Ad hoc 0118 R2-1800273, Vancouver, Canada, Jan. 11, 2018, 4 pages.

KT Corp, "Consideration on Access Control in NR" 3GPP TSG-RAN WG2 NR Ad Hoc #1801 R2-1800608, Vancouver, Canada, Jan. 12, 2018, 4 pages.

* cited by examiner

METHODS, APPARATUS AND SYSTEMS FOR INDICATING A CONFIGURATION OF ACCESS CONTROL INFORMATION IN A WIRELESS COMMUNICATION

TECHNICAL FIELD

The disclosure relates generally to wireless communications and, more particularly, to methods, apparatus and systems for indicating a configuration of access control information in a wireless communication.

BACKGROUND

Mobile communications have a rapid development such that they have brought tremendous influence to people's life, work, social, political and economic aspects. Human society has entered an era of information, where all kinds of business applications have shown explosive growth in demand. In the future, mobile networks can not only provide communications between people, but also serve massive equipment of the Internet of Things. For example, for a business with high speed service needs like virtual reality or high-definition video, its transmission rate can reach 10 to 100 times the current rate. In another example, for car networking and other services with low latency requirements, the end-to-end delay can be shortened 5 times. In another example, businesses accessible to the Internet of things will be extended 1,000 times, and the battery life can be extended 10 times.

The access control function is a basic function of a radio access network, e.g. a mobile network. In a long-term evolution (LTE) network, the access control methods include: the base station side broadcasts an access control criterion through a system broadcast message, and the terminal reads the parameters in the system broadcast message, then the terminal performs the access control according to the parameters.

The access control function in a fifth-generation (5G) new radio (NR) network controls the access of terminal service requests by an access criterion. Different access criteria relate to different access identities and different access categories. That is, different combinations of access identities and access categories correspond to different access criteria. There are currently 16 categories of access identities and 64 access categories. Therefore, the access criteria can reach up to 1024 kinds. For each access criterion, the base station configures a corresponding access control parameter, which may be a barring factor and a barring time, or a barring bitmap. In the LTE phase, there are 16 kinds of barring factors, such that at least 4 bits are needed for configuration of the barring factors. There are 8 kinds of barring times, such that at least 3 bits are needed for configuration of the barring times. Therefore, access control criteria require a maximum of 7168 bits. In addition, the control parameters of the radio resource control (RRC) states (such as the connected state, the idle state, and the inactive state) of different terminals may be different. If each state is configured with a different access control parameter, a maximum of 21504 bits of information are required for access control. The 5G phase also supports network sharing among multiple operators. Since each operator can configure different access control criteria according to its policy, and the number of carriers that may support network sharing in the 5G phase is 16, it requires at maximum 344064 bits of information in remaining minimum system information (RMSI) to configure access control. RMSI uses valuable public control resources and it is clear that RMSI does not have enough space to support such a large amount of access control criteria.

Thus, existing systems and methods for access control in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: transmitting an indicator to at least one wireless communication device. The indicator indicates a configuration of access control information related to the at least one wireless communication device.

In a further embodiment, a method performed by a wireless communication device is disclosed. The method comprises: receiving an indicator from a wireless communication node. The indicator indicates a configuration of access control information related to the wireless communication device.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
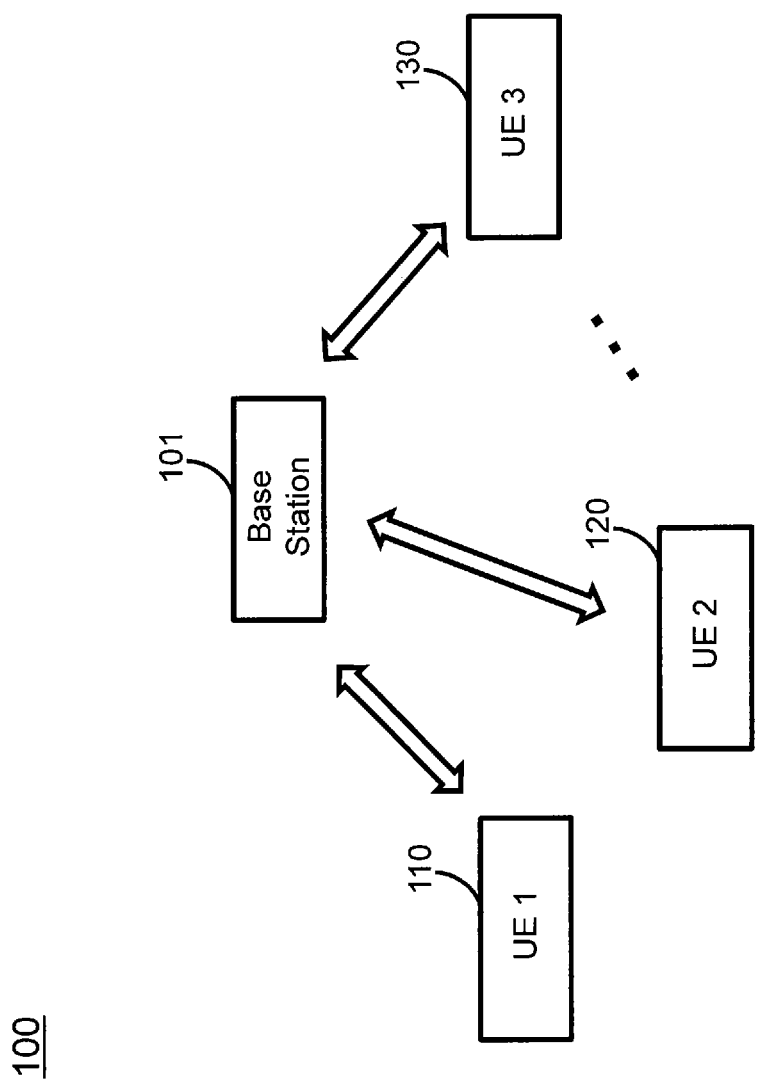
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. Configurations for access criteria in a wireless communication system, e.g. the fifth-generation (5G) new radio (NR) network, are becoming more complex. It needs more and more information to configure the access criteria. A remaining minimum system information (RMSI) message can no longer fully carry the complete access criteria.

In response to this problem, the present disclosure provides methods for indicating access criteria for terminals or UEs. A direct approach is to carry access control criteria in non-RMSI system broadcast messages, e.g. OSI (other system information). For example, cell reselection configuration information can be placed in OSI. However, unlike the cell reselection configuration information, the base station may not necessarily configure certain access control criteria. According to an operator policy, the base station configures access control criteria in some areas and does not configure these access control criteria in other areas. In addition, the terminal may not necessarily read all the access control criteria, and the terminal may have different methods of obtaining access control criteria. In one embodiment, depending on the operator's strategy and network deployment, the base station may configure some policy criteria in some areas and configure different policy criteria in another area. Since the terminal does not know the network deployment and policy information, the terminal is not aware of whether the base station still provides other access control information except that the terminal must read the access control information in the RMSI.

Depending on the status and needs of the terminal, it is not necessary for the terminal to read all the information provided by the network. For example, when the terminal is in an idle state, it is not necessary to read the access control criteria under the connected state provided by the network or base station. But the terminal does not know what need to be read, and what need not be read. Therefore, this information needs to be explicitly configured on the base station or the network side.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

In one embodiment, to indicate access control criteria, the network side transmits configuration or indication information of the access control criteria to the terminal. After receiving a request for acquiring access control criteria transmitted by the terminal, the network side transmits the requested access control criteria to the terminal. For the terminal, after the terminal receives the configuration or indication information of the access control criteria from the network side, the terminal transmits a request for acquiring access control criteria to the network side, and receives the access control criteria transmitted by the network side.

The configuration or indication information of the access control criterion includes one or more of the following: availability of the access control criterion; at least one manner for the terminal to acquire the access control criterion; and at least one condition for the terminal to acquire the access control criterion. The availability indication refers to an access control criterion that the base station can send in other ways than broadcasting it in the RMSI. The terminal may acquire the access control criteria by other means besides RMSI. The manner for acquiring the access control criteria refers to a manner in which the terminal acquires the access control criterion, and the terminal can obtain the access control criterion in one of the following ways: via a remaining minimum system information (RMSI) message; via an other system information (OSI) message; via an on demand mode OSI; and via a dedicated radio resource control (RRC) message.

The network side may indicate the specific OSI information that carries the access control criteria, e.g., an identifier of the OSI, an identifier of the SI, etc. The network side may instruct the terminal to actively trigger an on demand OSI message to acquire the access control criteria via a non-RMSI broadcast. The network side may instruct the terminal to acquire the access control criteria through a RRC dedicated signaling. The condition for the terminal to acquire the access control criterion means that the access control criterion can be obtained only when the condition is satisfied. For example, the condition may be satisfied when the terminal enters a connected state (e.g. RRC_CONNECTED) or a non-connected state (e.g. RRC_INACTIVE). The network side may transmit the configuration or indication information of access control criteria to the terminal, in any of the following manners: via RMSI, via OSI, via paging, or via a dedicated RRC message.

The disclosed method solves the issue that excessive access control parameters impact a system broadcast message, and improves the system performance. At the same time, the terminal does not need to read all the access control parameters based on this method, which brings a beneficial effect of energy saving to the terminal.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. These UEs have been selected into the cellular network of the BS 101 based on a cell selection process. Then, for each UE to perform an application or service via the network 100, the BS 101 will control the access of the application or service into the network 100 based on access control information, e.g. access control criteria. The BS 101 sends the access control related configuration for different applications or services to the UEs. But due to limited space of public control resource and to avoid unnecessary reading at the UE side, the BS 101 may transmit an indicator to indicate a configuration of the access control information, according to various embodiments.

Figure 2:
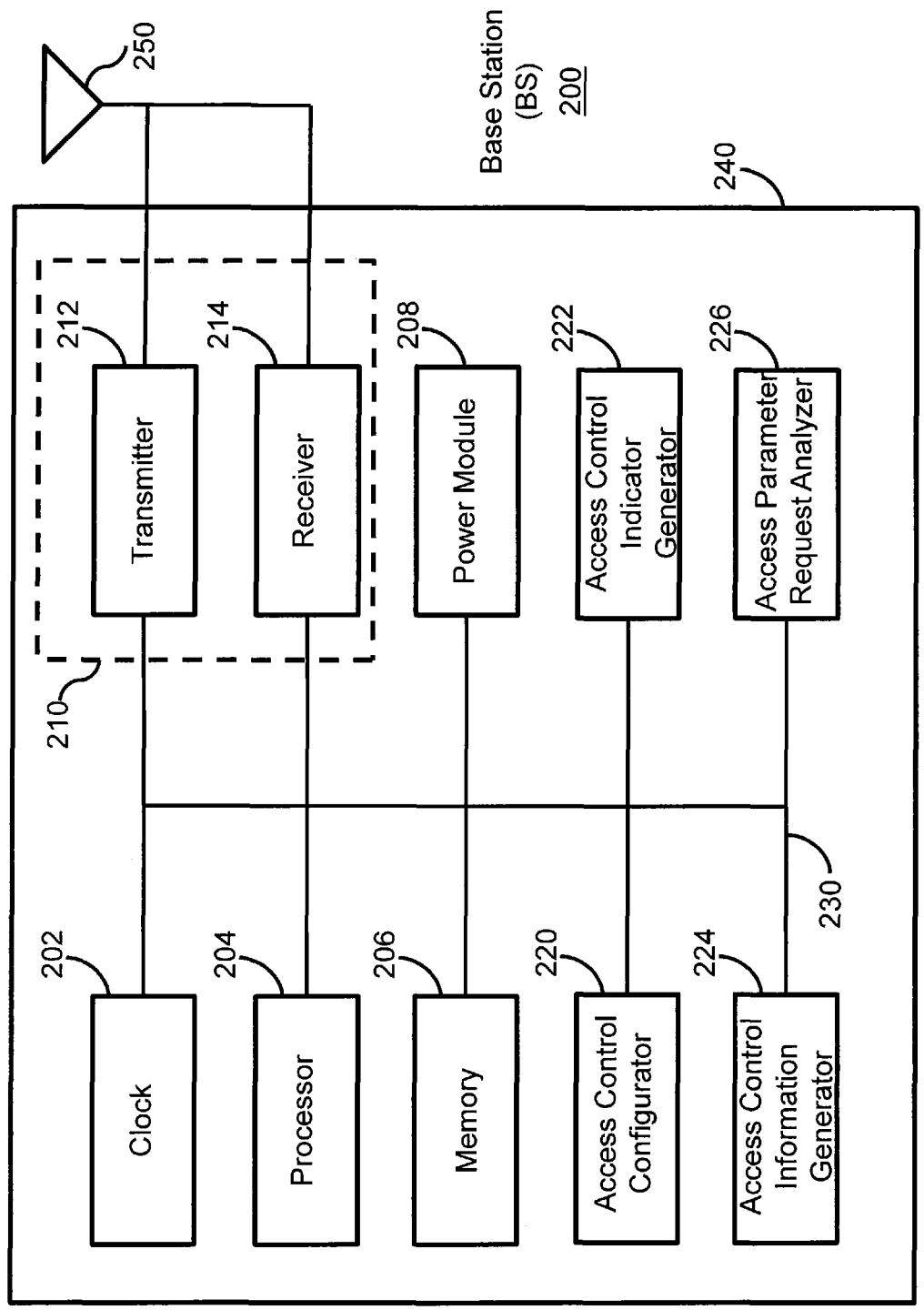
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, an access control configurator 220, an access control indicator generator 222, an access control information generator 224, and an access parameter request analyzer 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., the BS or another UE). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may control access of different applications or services from UEs within the network of the BS 200, by configuring access control information related to the UEs. For example, the access control configurator 220 may generate a configuration of the access control information that includes information for controlling access into a network associated with the BS 200 by an application or a service of the UEs. The configuration may include information about at least one of: availability of the access control information; at least one manner for transmitting the access control information; and at least one condition for the UEs to obtain the access control information. The at least one manner includes transmitting at least part of the access control information via at least one of: a remaining minimum system information (RMSI) message; an other system information (OSI) message; an on demand mode OSI; and a dedicated radio resource control (RRC) message. The at least one condition includes a condition for the UEs to enter a connected state, an inactive state, or an idle state, to obtain at least part of the access control information.

The access control configurator 220 may configure that an indicator is to be transmitted to indicate the configuration of the access control information. Accordingly, the access control indicator generator 222 in this example may generate the indicator and transmit, via the transmitter 212, the indicator to the UEs. According to various embodiments, the indicator is transmitted via at least one of: an RMSI message; an OSI message; a paging message; and a dedicated RRC message.

The access control configurator 220 may determine a transmission manner of the access control information. Accordingly, the access control information generator 224 in this example may generate the access control information and transmit, via the transmitter 212, the access control information to the UEs based at least partially on the indicator generated by the access control indicator generator 222.

In one embodiment, the access control configurator 220 may configure that the indicator and at least a first portion of the access control information are transmitted via a first signal. The indicator generated by the access control indicator generator 222 here may indicate whether a second portion of the access control information is to be transmitted via a second signal. If so indicated, the second portion of the access control information is transmitted via the second signal, where the second signal is determined based on at least one of: a predetermined protocol and the configuration indicated by the indicator. In one example, the second signal comprises an additional indicator indicating whether a third portion of the access control information is to be transmitted via a third signal. In another example, the first portion comprises a common portion of access control information of a plurality of network operators sharing the network associated with the BS 200. In yet another example, the first portion and the second portion include different access control information based on at least one of: an access identity of each UE; and an access category of each application or service under access control of the BS 200.

The access parameter request analyzer 226 in this example may receive, via the receiver 214, a request for the second portion from an UE. The request is generated by the UE based on the indicator. For example, this may happen when the access control configurator 220 configures an on demand mode for the UE. In this case, the BS 200 transmits the second portion to the UE in response to the request.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the access control configurator 220. Conversely, each of the modules illustrated in FIG. 2 can be implemented using a plurality of separate components or elements.

Figure 3:
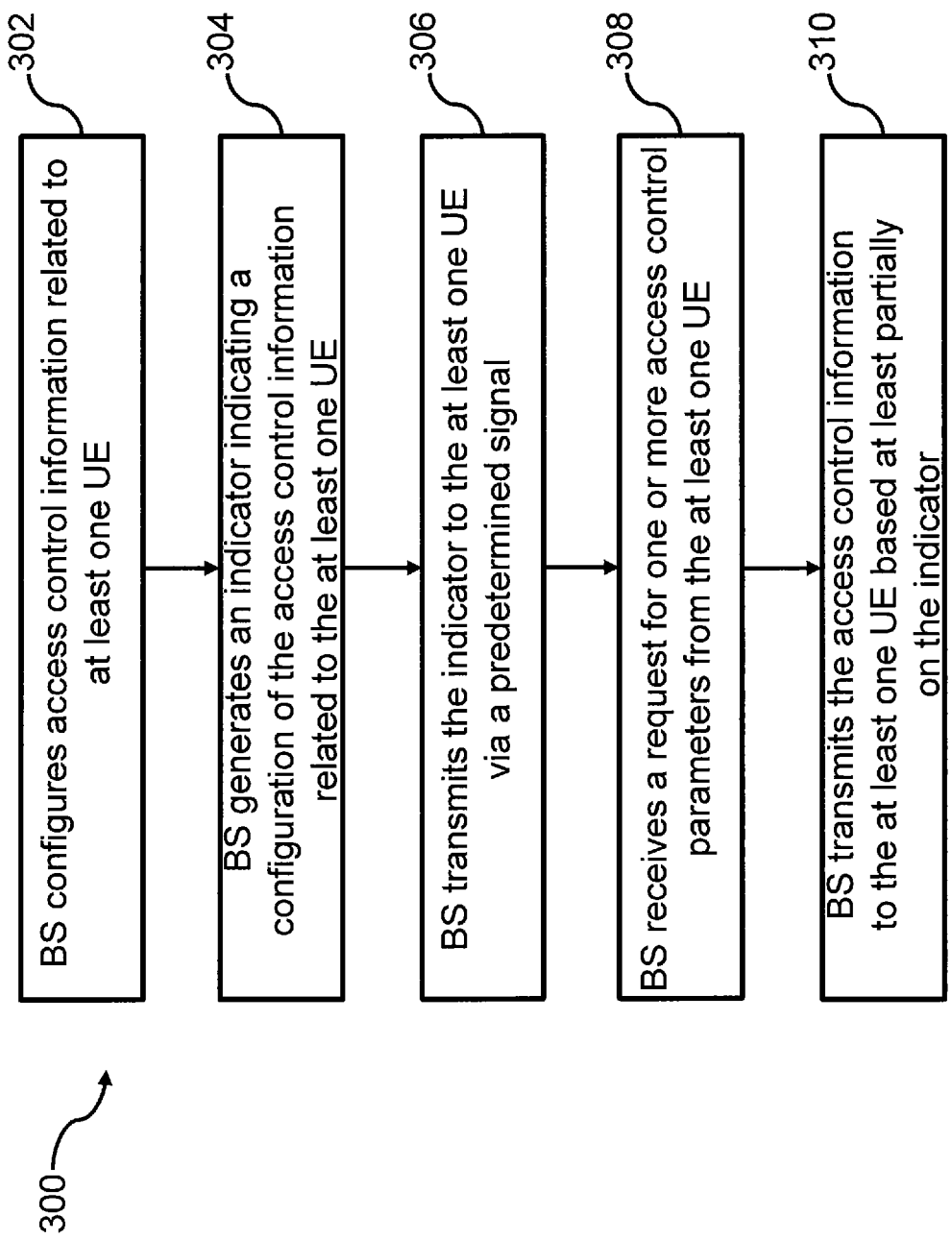
FIG. 3 illustrates a flow chart for a method performed by a BS for access control in a wireless communication, in accordance with some embodiments of the present disclosure.

FIG. 3 illustrates a flow chart for a method 300 performed by a BS, e.g. the BS 200 in FIG. 2, for access control in a wireless communication, in accordance with some embodiments of the present disclosure. At operation 302, the BS configures access control information related to at least one UE. At operation 304, the BS generates an indicator indicating a configuration of the access control information related to the at least one UE. The BS transmits at operation 306 the indicator to the at least one UE via a predetermined signal, e.g. an RMSI signal. At operation 308, the BS receives a request for one or more access control parameters from the at least one UE. At operation 310, the BS transmits the access control information to the at least one UE based at least partially on the indicator.

Figure 4:
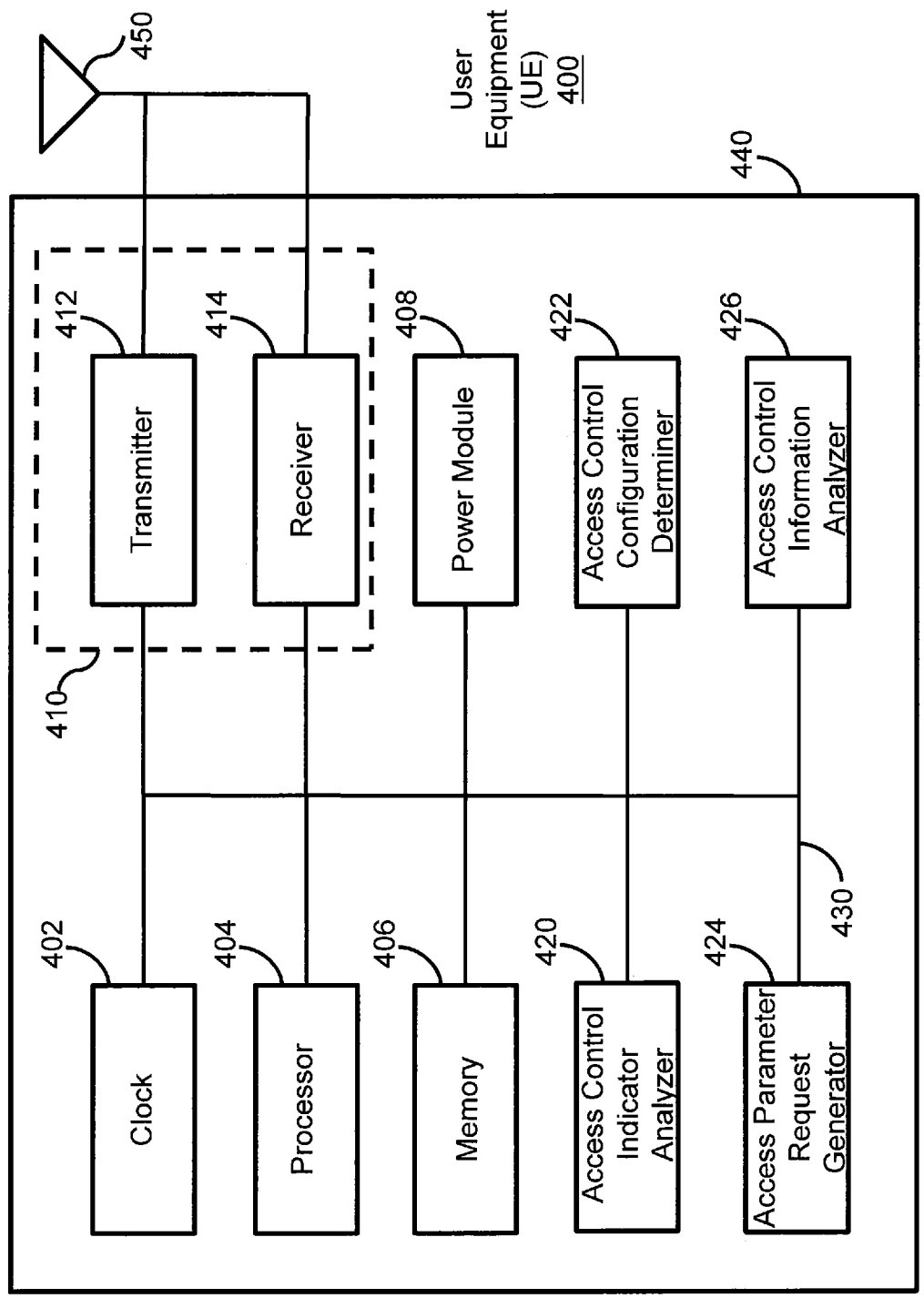
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, an access control indicator analyzer 420, an access control configuration determiner 422, an access parameter request generator 424, and an access control information analyzer 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The access control indicator analyzer 420 in this example may receive, via the receiver 414, an indicator from a BS. The indicator indicates a configuration of access control information, e.g. access control criteria, related to the UE 400. The access control information includes information for controlling access into a network associated with the BS by an application or a service of the UE 400. In one embodiment, the indicator is received via at least one of: an RMSI message, an OSI message, a paging message, or a dedicated RRC message. The access control indicator analyzer 420 may send the received indicator to the access control configuration determiner 422 for determining the configuration.

The access control configuration determiner 422 in this example may determine the configuration of the access control information based on the indicator. In one embodiment, the configuration includes information about at least one of: availability of the access control information; at least one manner for the UE 400 to obtain the access control information; and at least one condition for the UE 400 to obtain the access control information. The at least one manner includes obtaining at least part of the access control information via at least one of: an RMSI message; an OSI message; an on demand mode OSI; and a dedicated RRC message. The at least one condition includes a condition for the UE to enter a connected state, an inactive state or an idle state to obtain at least part of the access control information. The access control configuration determiner 422 may send the determined configuration to the access parameter request generator 424 for generating an access parameter request, and/or to the access control information analyzer 426 for receiving and analyzing the access control information.

The access parameter request generator 424 in this example may generate a request for access control parameters based on the configuration determined by the access control configuration determiner 422. For example, when the configuration indicates an on demand mode for the UE 400 to obtain one or more portions of the access control information, the access parameter request generator 424 can generate a request and transmit, via the transmitter 412, to the BS for the one or more portions.

The access control information analyzer 426 in this example may receive, via the receiver 414, and analyze the access control information from the BS based at least partially on the indicator received by the access control indicator analyzer 420, or based on the configuration determined by the access control configuration determiner 422. For example, when the configuration indicates an on demand mode for the UE 400 to obtain one or more portions of the access control information, the access control information analyzer 426 can receive, from the BS, and analyze the one or more portions transmitted by the BS in response to the request generated by the access parameter request generator 424.

In one embodiment, the access control indicator analyzer 420 may receive, via the receiver 414, a first signal that carries both the indicator and at least a first portion of the access control information. The access control indicator analyzer 420 can analyze the indicator to determine whether a second portion of the access control information is to be transmitted by the BS via a second signal. Alternatively, the access control configuration determiner 422 can determine whether a second portion of the access control information is to be transmitted by the BS via a second signal, based on the configuration indicated by the indicator. If so determined, the access control information analyzer 426 can receive the second portion of the access control information via the second signal, where the second signal may be determined based on at least one of: a predetermined protocol and the configuration indicated by the indicator. In one embodiment, the access parameter request generator 424 generates a request for the second portion based on the indicator or the configuration indicated by the indicator, and transmits, via the transmitter 412, the request to the BS. The BS will transmit the second portion in response to the request.

In one example, the second signal comprises an additional indicator indicating whether a third portion of the access control information is to be transmitted by the BS via a third signal. If so determined by the UE 400, the access control information analyzer 426 will determine and receive the third signal and analyze the access control information carried by the third signal as well. In another example, the first portion comprises a common portion of access control information of a plurality of network operators sharing a network associated with the BS. In yet another example, the first portion and the second portion include different access control information based on at least one of: an access identity of each UE associated with the BS; and an access category of each application or service under access control of the BS.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the access control indicator analyzer 420. Conversely, each of the modules illustrated in FIG. 4 can be implemented using a plurality of separate components or elements.

Figure 5:
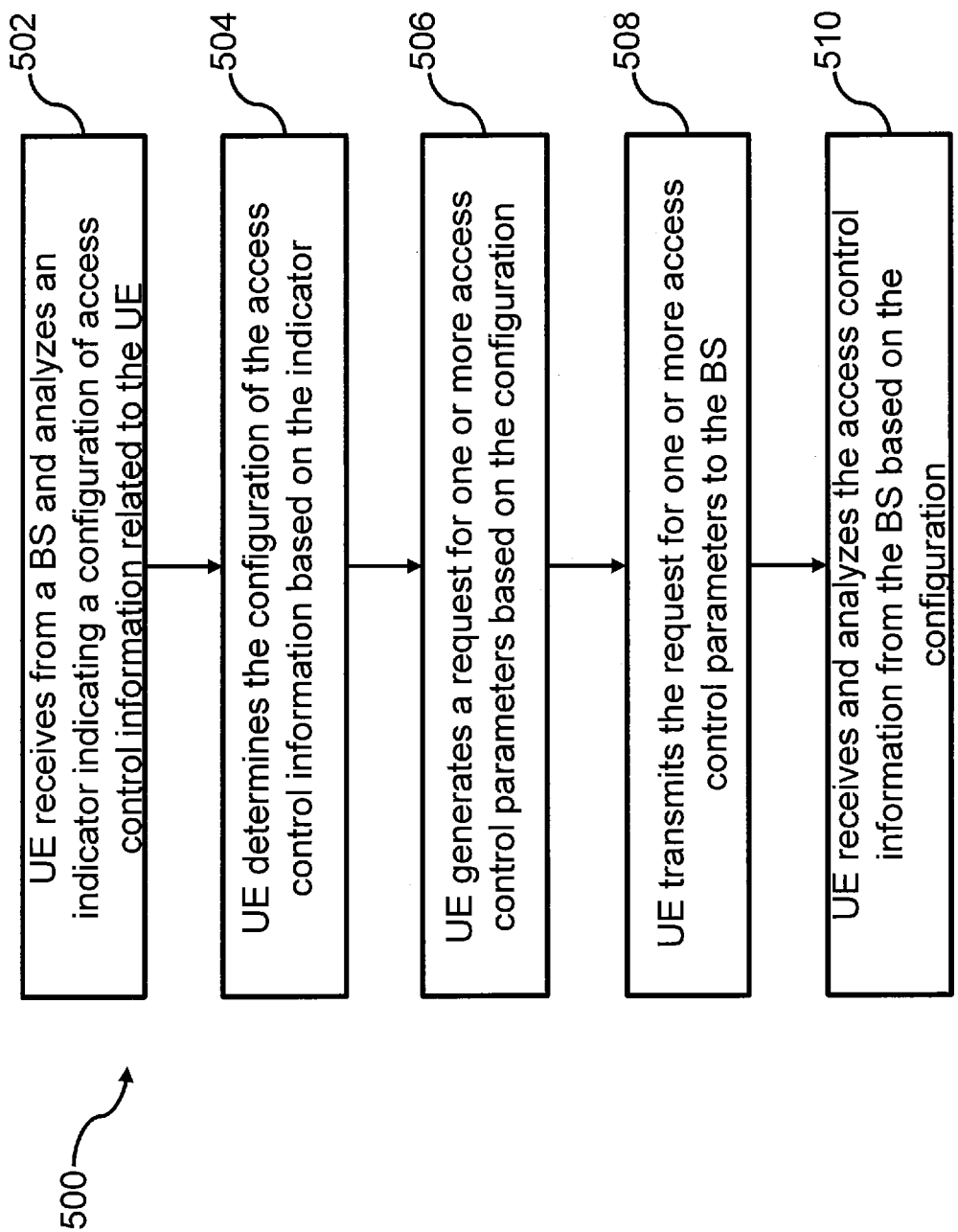
FIG. 5 illustrates a flow chart for a method performed by a UE for access control in a wireless communication, in accordance with some embodiments of the present disclosure.

FIG. 5 illustrates a flow chart for a method 500 performed by a UE, e.g. the UE 400 in FIG. 4, for access control in a wireless communication, in accordance with some embodiments of the present disclosure. At operation 502, the UE receives from a BS and analyzes an indicator indicating a configuration of access control information related to the UE. At operation 504, the UE determines the configuration of the access control information based on the indicator. The UE generates at operation 506 a request for one or more access control parameters based on the configuration. The UE transmits at operation 508 the request for one or more access control parameters to the BS. At operation 510, the UE receives and analyzes the access control information from the BS based on the configuration.

Different embodiments of the present disclosure will now be described in detail hereinafter. It is noted that the features of the embodiments and examples in the present disclosure may be combined with each other in any manner without conflict.

Figure 6:
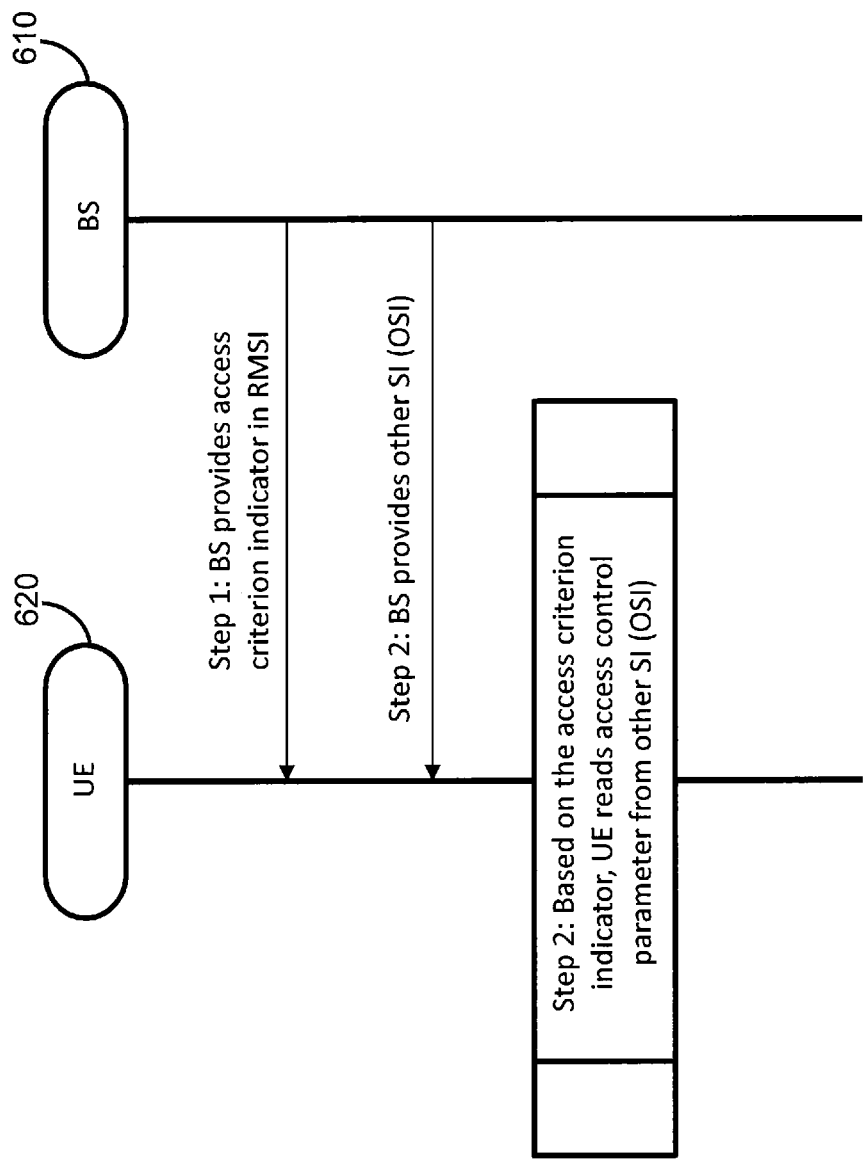
FIG. 6 illustrates an exemplary method for indicating a configuration of access control information to a UE, in accordance with an embodiment of the present disclosure.

According to various embodiments of the present disclosure, a method is provided for indicating a configuration of access control information, e.g. access control criteria related to one or more terminals. FIG. 6 illustrates an exemplary method for indicating a configuration of access control information to a UE, in accordance with a first embodiment of the present disclosure. As shown in FIG. 6, in the first embodiment, the BS 610 broadcasts configuration or indication information of access control criteria to the UE or terminal 620, e.g. an access criterion indicator, in an RMSI message at Step 1. The RMSI here includes core access control configurations while there are other configurations of access control criteria in OSI. For example, the BS 610 broadcasts the configuration or indication information of access control criteria in the RMSI, using one bit to identify that there are other access control criteria that need to be read by the UE 620. In one embodiment, the configuration of the access control criteria can be determined according to the protocol (or prior agreement) so that the RMSI may only indicate the availability of the access control information, and need not to indicate any specific OSI that carries the access control information. At Step 2, the BS 610 sends the OSI message to the terminal 620, such that the terminal 620 reads other access control criteria in OSI, based on the access criterion indicator.

On the terminal side, the terminal first reads the one-bit configuration or indication information of access control criteria in the RMSI. Then, the terminal determines the OSI that needs to be read and reads all the information according to the protocol (or the prior agreement). The information contains the parameter configurations of other access control criteria provided by the BS 610. The terminal saves the configuration and turns on access control function for a service or application.

Figure 7:
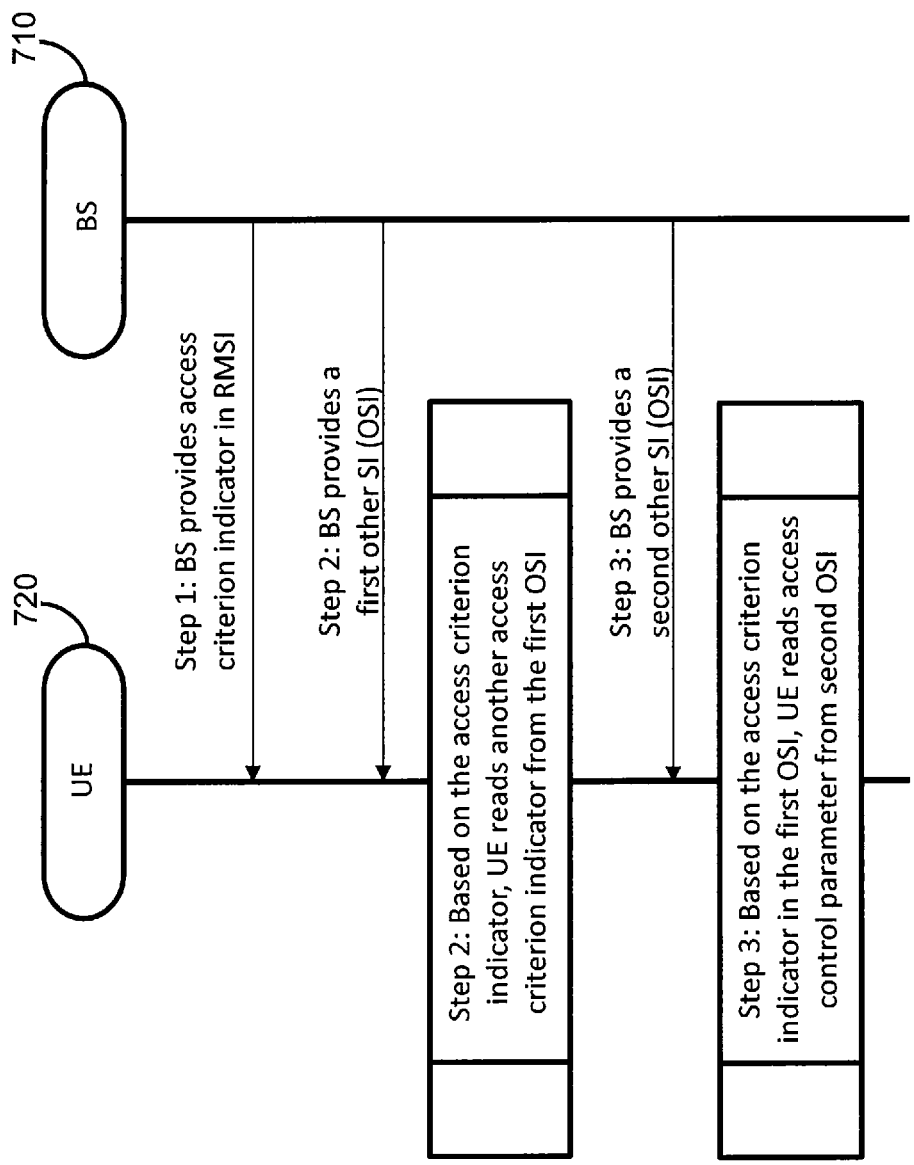
FIG. 7 illustrates another exemplary method for indicating a configuration of access control information to a UE, in accordance with an embodiment of the present disclosure.

FIG. 7 illustrates another exemplary method for indicating a configuration of access control information to a UE, in accordance with a second embodiment of the present disclosure. The second embodiment is different from the first embodiment in that the base station 710 can also broadcast the configuration or indication information of access control criteria in a first OSI, where the first OSI refers to the OSI directly indicated by RMSI. As shown in FIG. 7, in the second embodiment, the BS 710 broadcasts configuration or indication information of access control criteria to the UE or terminal 620, e.g. an access criterion indicator, in an RMSI message at Step 1. In addition, the BS 710 also broadcasts the configuration or indication information of the access control criterion in a first OSI. The configuration or indication information of the access control criteria broadcasted by the base station in the first OSI indicates another OSI that needs to be read or the condition for the terminal to acquire the access control criteria. The terminal 720 reads the access control criterion indicator in the first OSI at Step 2. After reading the indicator in the first OSI, the terminal 720 needs to obtain information by reading another OSI or through RRC signaling. In this example, the indicator in the first OSI indicates additional access control parameter in a second OSI. As such, at Step 3, the BS 710 sends the second OSI to the terminal 720. The terminal 720 operates at Step 3 according to the access control criterion indicator in the first OSI read in Step 2, and reads the access control criterion parameters in the second OSI. The terminal then saves the configuration and turns on access control. It can be understood by one skilled in the art that the BS 710 here may send each of the OSIs at the same time as the RMSI at Step 1.

Figure 8:
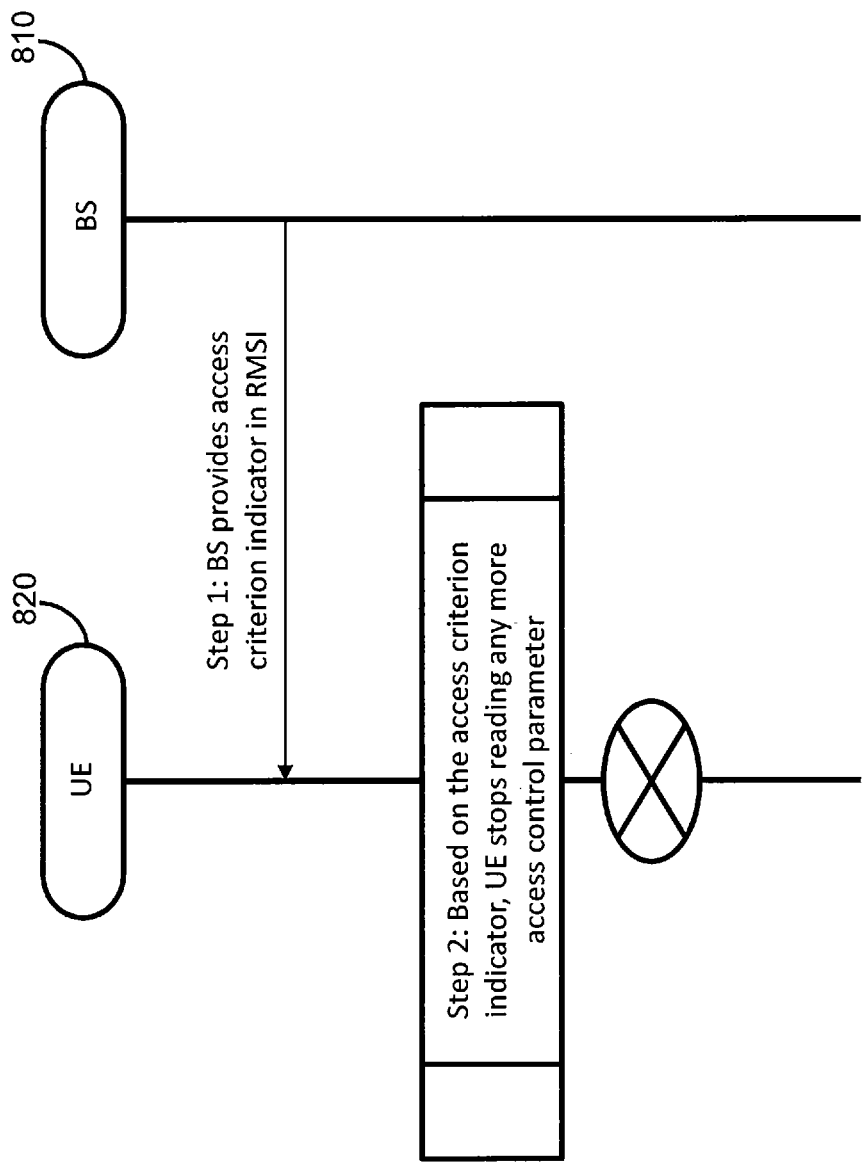
FIG. 8 illustrates yet another exemplary method for indicating a configuration of access control information to a UE, in accordance with an embodiment of the present disclosure.

FIG. 8 illustrates yet another exemplary method for indicating a configuration of access control information to a UE, in accordance with a third embodiment of the present disclosure. The basic flow of the third embodiment is similar to the first embodiment, except that the base station 810 in the third embodiment indicates in RMSI that there is no other configuration for access control parameter information. As shown in FIG. 8, in the third embodiment, the BS 810 broadcasts configuration or indication information of access control criteria to the UE or terminal 620, e.g. an access criterion indicator, in an RMSI message at Step 1, to indicate that there is no other configuration for access control criterion. For example, the configuration or indication information of the access control criterion may be configured as "No", and the terminal 820 needs not to try to acquire other access control information, so as to achieve the purpose of power saving of the terminal. At Step 2, the terminal 820 reads only the access control parameters in the RMSI.

Figure 9:
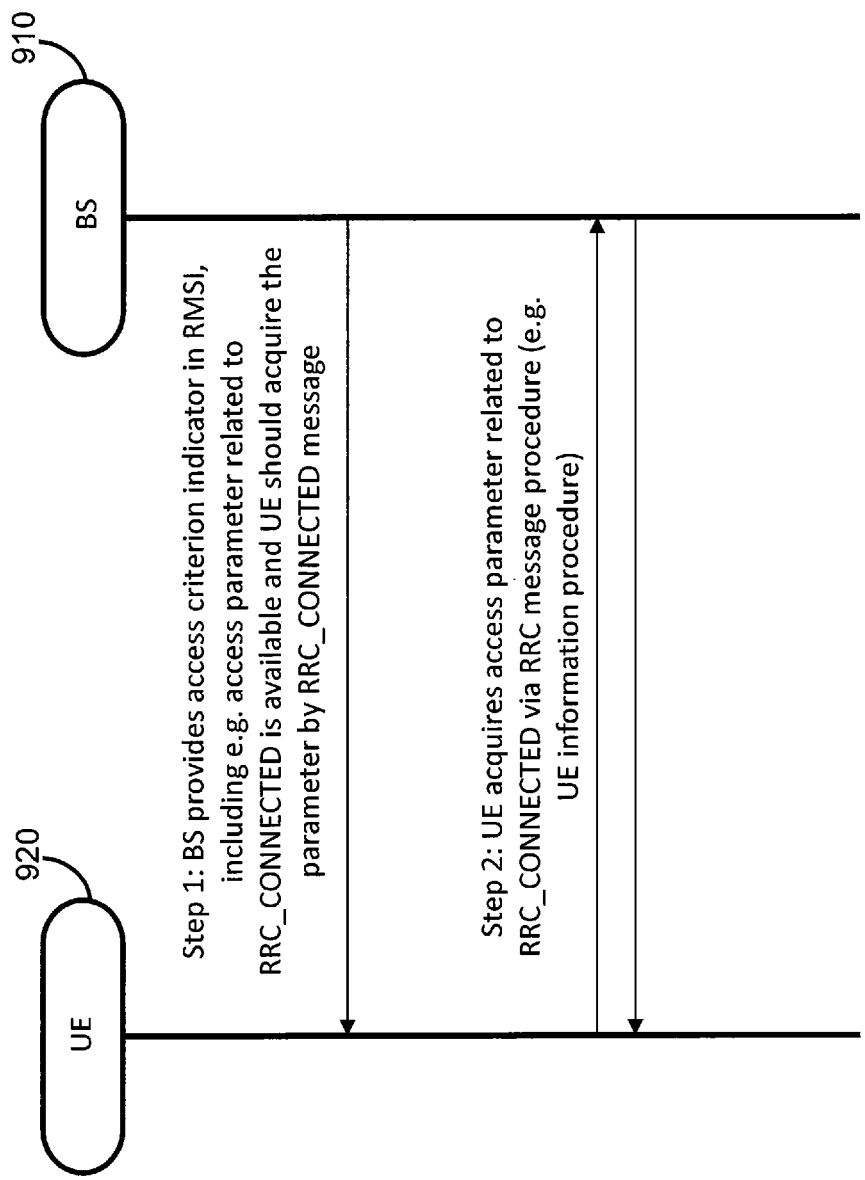
FIG. 9 illustrates an exemplary method for indicating a configuration of access control information to a UE based on a connection state of the UE, in accordance with an embodiment of the present disclosure.

FIG. 9 illustrates an exemplary method for indicating a configuration of access control information to a UE based on a connection state of the UE, in accordance with a fourth embodiment of the present disclosure. The basic flow of the fourth embodiment is similar to the first embodiment, except that the base station 910 in the fourth embodiment indicates that the OSI stores the configuration for terminals in the RRC_inactive state or the RRC_connected state. At Step 1, the base station 910 broadcasts the configuration or indication information of the access control criterion in the RMSI to indicate that the configuration in the OSI is an access control parameter in an RRC_inactive state or an RRC_connected state. Then at Step 2, the terminal 920 obtains the configuration or indication information of access control criteria. In one example, the terminals in an idle state do not read access control information in the OSI. In another example, the terminals in the RRC_inactive state or RRC_connected state can directly read the OSI according to the configuration, or trigger an on demand request and then read the OSI, or obtain the information through RRC dedicated signaling. A UE having an RRC_inactive state here means the UE is connected to the core network, but having no RRC connection yet.

Figure 10:
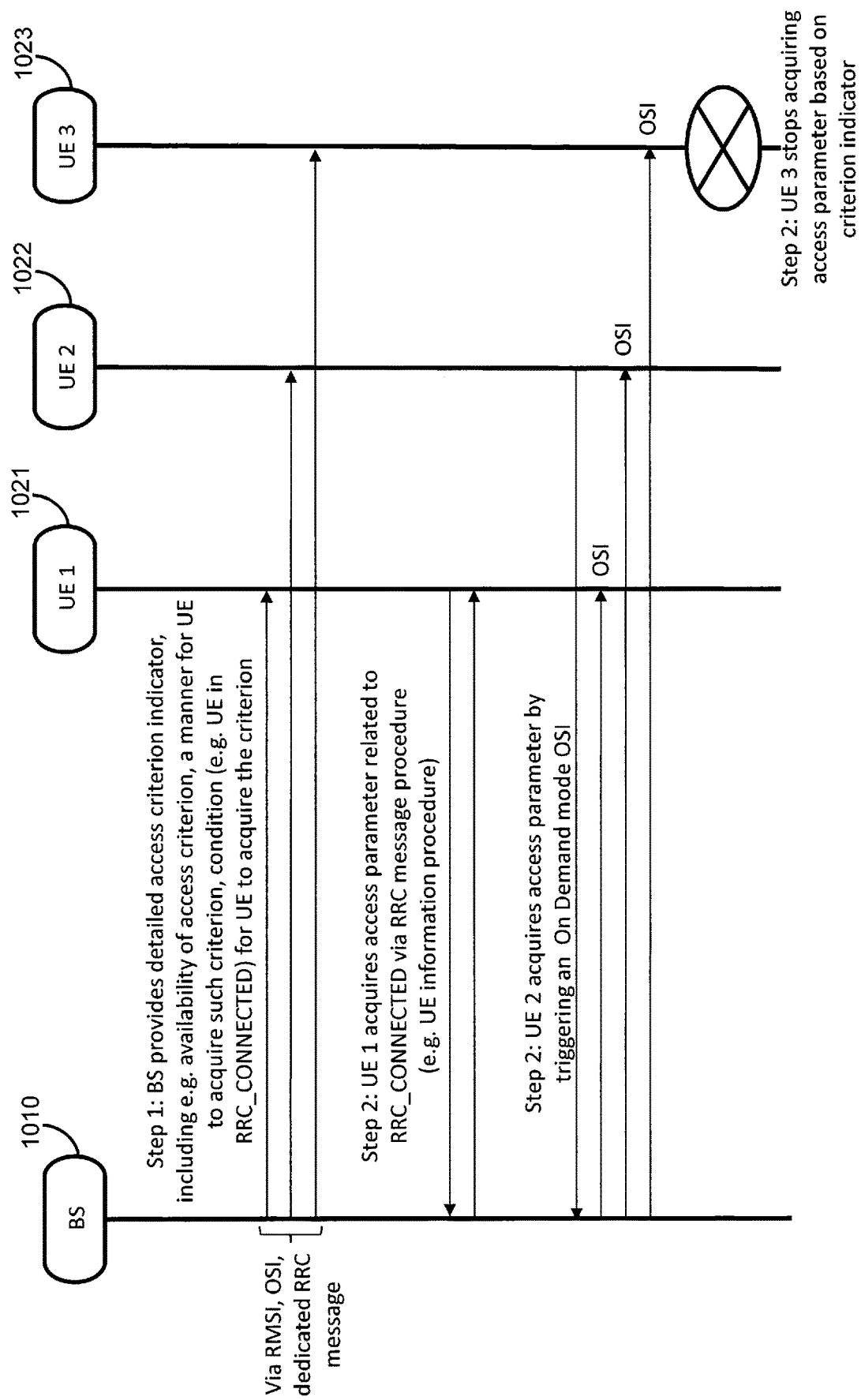
FIG. 10 illustrates an exemplary method for indicating a configuration of access control information to a plurality of UEs, in accordance with an embodiment of the present disclosure.

FIG. 10 illustrates an exemplary method for indicating a configuration of access control information to a plurality of UEs, in accordance with a fifth embodiment of the present disclosure. The basic flow of the fifth embodiment is similar to the first embodiment, except that the RMSI transmitted by the base station 1010 in the fifth embodiment specifies the information about the access control criteria that is not carried by the RMSI. The base station 1010 can control the behavior of the terminals 1021, 1022, 1023 through a finer configuration than that in the first embodiment. At Step 1, the base station 1010 broadcasts the configuration or indication information of access control criteria in the RMSI. The base station 1010 carries a detailed configuration in the configuration or indication information of the access control criterion. For example, it may list detailed access control criterion information like: access identity; access categories; whether or not the access control criterion exists; and if the access control criterion exists, the access control criterion can be obtained by the OSI broadcast, or by an On Demand request triggered by the terminal, or by an RRC dedicated message after the terminal entering the connected state. In order to save the control information, the base station 1010 may further group the access control criteria and then instruct the terminals' behavior according to the group information. In one example, there are 64 access categories that can be grouped into 8 groups, e.g. category 1 to category 8 for group 1, category 9 to category 16 for group 2, and so on. The base station 1010 indicates the configuration of access control criteria in groups. At Step 2, each terminal obtains configuration or indication information of access control criteria. Each terminal acquires the access control information by reading the OSI, by the system broadcast message triggered in On Demand mode, or by the RRC dedicated message after entering the connected state, according to the configuration or indication information of the detailed access control criterion configured by the base station 1010 at Step 1.

Figure 11:
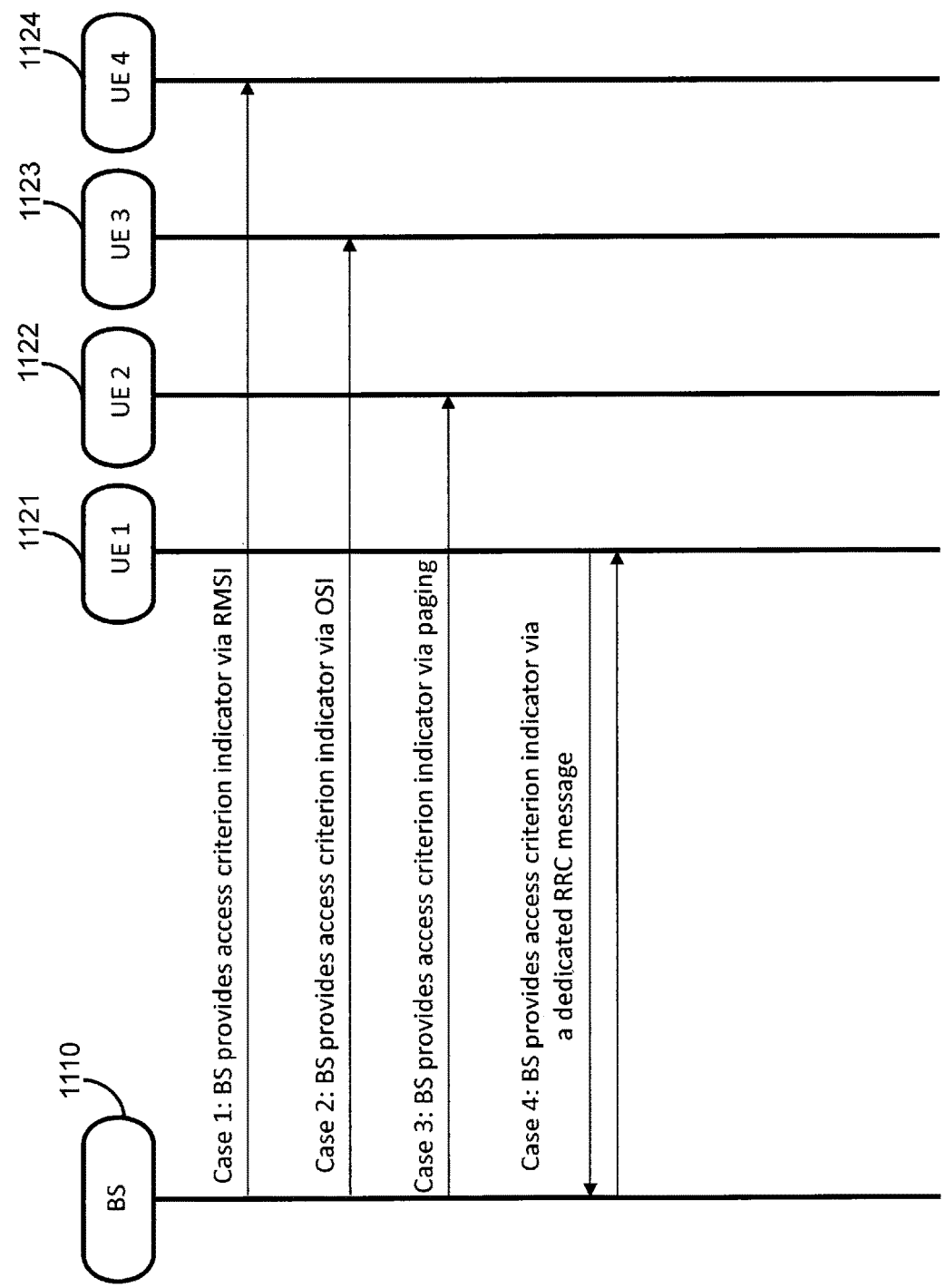
FIG. 11 illustrates an exemplary method for indicating different configurations of access control information to a plurality of UEs respectively, in accordance with an embodiment of the present disclosure.

FIG. 11 illustrates an exemplary method for indicating different configurations of access control information to a plurality of UEs respectively, in accordance with a sixth embodiment of the present disclosure. Different from the first embodiment, in the sixth embodiment, the manner in which the base station 1110 may configure the configuration or indication information of the access control criterion further includes: transmitting the configuration or indication information of access control criteria to a terminal through RMSI; transmitting the configuration or indication information of access control criteria to a terminal via the OSI; transmitting the configuration or indication information of access control criteria to a terminal through paging; and transmitting the configuration or indication information of access control criteria to a terminal through an RRC dedicated message.

In a seventh embodiment, according to a practical situation of 3GPP, the policy behavior of the base station is illustrated as below. In order to save the most valuable RMSI resources, what needs to be transmitted in the RMSI must be extremely important and basic access control criteria. In this embodiment, the most important access identities are selected in the following table:

| Important Access Identity | Description |
| --- | --- |
| Access Identity = 0 | Normal users |
| Access Identity = 1 | MPS (Multimedia Priority Service) |
| Access Identity = 2 | MCS (Mission Critical Service) |
| Access Identity = 11 | Access Class 11 |
| Access Identity = 12 | Access Class 12 |
| Access Identity = 13 | Access Class 13 |
| Access Identity = 14 | Access Class 14 |
| Access Identity = 15 | Access Class 15 |

In this embodiment, the most important access categories are selected in the following table:

| Important Access Category | Description |
| --- | --- |
| Access categories = 1 | Delay Insensitive Type |
| Access categories = 2 | Emergency |
| Access categories = 3 | mobile original signaling resulting from other than paging |
| Access categories = 4 | multimedia telephony service (MMTEL) voice |
| Access categories = 5 | multimedia telephony service (MMTEL) video |
| Access categories = 6 | Short Message Service (SMS) |
| Access categories = 7 | mobile original data that do not belong to any other Access Categories |

The information that a base station needs to deliver in RMSI includes three parts: the first part is the configuration of a normal user with access identify=0; the second part is the configuration of high priority users when access identify is within (1, 2, 11, 12, 13, 14, 15); and the third part is the configuration of the configuration or indication information of access control criteria, i.e. the configuration of the indicator.

The configuration for the first part is shown below:

| Access Identity | Access categories | Access Control Parameter | Other auxiliary parameters | Used bit resources |
| --- | --- | --- | --- | --- |
| 0 (4 bit) | 1 (6 bit) | Barring factor (4 bit), barring time (3 bit) | Needed auxiliary parameters (2 bit) | |
| ... | ... | | No need | ... |
| 0 (4 bit) | 7 (6 bit) | 7 bit | No need | |

There are 16 kinds of access identities, which need a 4-bit identification. There are 64 kinds of access categories, which need a 6-bit identification. The barring factor and barring time parameters need 7-bit identifications. In addition, when access category=1, it needs to carry 2 more bits of auxiliary information. In this case, for access identify=0, a total of (4+6+7)*7+2=121 bits is required from the configuration resource, and a 128-bit structure can be configured for the terminal. Therefore, the first part of the configuration needs 128 bits.

The configuration for the second part is shown below:

| Access Categories | Access Identity and Access Parameter | Other auxiliary parameters |
| --- | --- | --- |
| 1 (6 bit) | 8-bit Bitmap (e.g. 10101010) Bit 1 indicates Access identify 1, Bit 2 indicates Access identify 2 Bit 3 indicates Access identify 11, | Needed auxiliary parameters (2 bit) |

-continued

| Access Categories | Access Identity and Access Parameter | Other auxiliary parameters |
| --- | --- | --- |
| | Bit 4 indicates Access identify 12 Bit 5 indicates Access identify 13, Bit 6 indicates Access identify 14 Bit 7 indicates Access identify 15, Bit 8 indicates nothing at this point For each bit, a bit value of 1 means access control is needed, and a bit value of 0 means access control is not needed. | |
| ... | ... | No need |
| 7 (6 bit) | 8 (6 bit), 7 bit | No need |

In this case, for access identify=(1, 2, 11, 12, 13, 14, 15), a total of (6+8)*7+2=100 bits are needed for the configuration resource to be used and a 128-bit structure can be configured to the terminal. For the third part, at least one bit is needed to identify the configuration of access control parameters carried by non-RMSI. The third part may be put together with the rest of the first part or the second part. For example, the second part needs 100 bits of information, but occupies a 128-bit data structure, of which 28 bits are free and can be used by the third part of the configuration or indication information of access control criteria. Based on the above calculations, the final number of bits used in RMSI is the first part (128 bits) plus the second part (128 bits) plus the third part (combined with the first part or the second part) for a total of 256 bits.

In an eighth embodiment, according to a practical situation of 3GPP, the policy behavior of the base station is illustrated as below. To perform an optimization on the seventh embodiment, the eighth embodiment simplifies the configuration of the second part in the seventh embodiment, and provides, based on the protocol and/or other static methods, that if the base station does not configure the second part, it means that all high-priority users are not subject to access control.

In this way, the base station need not configure the parameters of the second part of the seventh embodiment in the RMSI. If it is necessary for the base station to control the access of high-priority users in some cases, it can be configured separately for this situation. For example, the second part is configured as:

| Access Categories | Access Identity and Access Parameter | Other auxiliary parameters |
| --- | --- | --- |
| 3 | 10000000 | None |
| 4 | 01000000 | None |

In the above table, the first entry indicates that in this cell, the business with Access Categories=3 of the terminal Access Identity=1 is barred from accessing the network. The first entry takes 16 bits. The second entry indicates that in this cell, the business with Access Categories=4 of the terminal Access Identity=2 is barred from accessing the network. The second entry takes 16 bits. Any other high-priority terminal business can access the network at any time without the need of access control. According to the method of the eighth embodiment, the final number of bits used in RMSI is the first part (128 bits) plus the second part (32 bits) plus the third part (combined with the first part or the second part) for a total of 160 bits.

In a ninth embodiment, according to a practical situation of 3GPP, the policy behavior of the base station and the behavior of the terminal are illustrated as below. Even with the method of eighth embodiment, more than one hundred bits are needed to configure the access control parameters. Because in case of network sharing, the configurations of different operators are different, then multiple 160-bit access control parameters are needed to be configured, which is possible to exceed the capacity of RMSI.

In one case, what is broadcasted in RMSI is the common part of the access control criteria of all network sharing operators. Then different access control parameters of each operator compared to this common part can be placed in the OSI configuration. One way is through the protocol or other static agreements, the unique access control parameters of the operators are placed in one or more OSIs. The relationship between the operator network identification public land mobile network (PLMN) and the stored OSI can be statically stipulated by agreement. After reading the common access control parameters in the RMSI, the terminal may determine the OSI and read the information according to the relationship between the PLMN and the OSI specified in the protocol.

Another way is that the base station configures the relationship between the PLMN and the OSI based on the configuration or indication information of the access control criterion. After the terminal reads the configuration or indication information of the access control criterion in the third part of the read RMSI, it can know which OSIs have configured PLMN and then can read the access control parameters according to this information.

According to the solution of the ninth embodiment, the RMSI only needs to carry the access control parameters of the common part of the PLMN. Therefore, the data amount is further reduced. For example, it only needs 64 bits for identification. The relationship between PLMN and OSI takes from 4 and 8 bits. Therefore, in the ninth embodiment, the number of bits to be transmitted in RMSI is 64+8=72 bits.

In a tenth embodiment, based on the ninth embodiment, the configuration of insignificant Access Categories is further considered. In the seventh, eighth, and ninth embodiments, to save the access control parameters configured on the RMSI, the base station only broadcasts the most important access control information. For example, for access controls with Access Categories being 16 to 64, the terminal needs a way to know how these access control parameters are transmitted to the terminal.

There are two ways for the terminal to know this. One is through the agreement of the protocol, e.g. Access Categories 16-32 are designated to be broadcasted in a given OSI. The terminal reads the RMSI and then reads the access control parameters of the Access Categories 16-64 in the OSI according to the protocol. Alternatively, the base station may indicate, for example, that the Access Categories 16-32 are broadcasted in OSI 4, Access Categories 32-38 are broadcasted in OSI 8, so on and so forth, by the configuration or indication information of the access control criterion. After obtaining the indication, the terminal obtains the information in the corresponding OSI according to the indication.

In an eleventh embodiment, based on the ninth embodiment, a method for configuring different access controls under different RRC states is further considered. There are several ways disclosed here. For example, the base station may broadcast in the OSI the access control criteria parameters under the RRC connected state and/or the RRC inactive state. The information may not necessarily be configured for each cell. Therefore, the base station may send the configuration or indication information of the access control criterion in the RMSI to indicate that there is an access control criterion under an RRC connected state and/or an RRC inactive state in the OSI of the cell. After reading the configuration or indication information of the access control criteria, the terminal knows that the access control parameter under the RRC connected state is stored in, e.g. OSI 4, and needs to be obtained through the on demand mode. The terminal then initiates the on demand message to acquire the configuration.

In a twelfth embodiment, based on the ninth embodiment, another method for configuring different access controls under different RRC states is further considered. Different from the eleventh embodiment, the base station in the twelfth embodiment may acquire the access control criterion parameters under the RRC connected state and/or the RRC inactive state after the terminal enters the connected state. The information may not be configured for each cell. Therefore, the base station may send the configuration or indication information of the access control criterion in the RMSI to indicate that there is an access control criterion under an RRC connected state and/or an RRC inactive state in the OSI of the cell, and indicate that the terminal needs to enter the connected state to obtain these parameters. After reading the configuration or indication information of the access control criteria, the terminal knows that the access control parameters under the RRC connected state is stored in the base station and needs to be acquired by entering the connected state. After entering the connected state, the terminal uses an RRC dedicated process (e.g. the UE information process) to obtain the access control configuration. The terminal may also access the network to obtain the parameters.

In a thirteenth embodiment, based on the seventh embodiment, another method to transmit the most important access control criteria in RMSI is further considered. The scenario described in the seventh embodiment is that the most important access control criteria are transmitted in the RMSI, according to a standard. For example, the access control criteria will be found in specification such as the 3GPP TS36.331 protocol. As such, both the terminal and the base station are aware of the specific access control criteria passed in the RMSI. The method provided in this embodiment is not limited to the access control criterion delivered by the RMSI, but specifies the maximum number of access control criteria allowed for delivery at the RMSI, for example, 8, 10, and 16. When configuring the access control of the cell, the base station selects the most important access control criteria according to the actual situation of the cell. In addition, the base station may transmit the configuration or indication information of the access control criteria in the RMSI to indicate a presence and an access method of other access control criteria, such as through OSI or through RRC dedicated messages.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, the method comprising:
transmitting an indicator to at least one wireless communication device, wherein
the indicator indicates a configuration of access control information related to the at least one wireless communication device,
the indicator and at least a first portion of the access control information are transmitted via a first signal, and the indicator indicates whether a second portion of the access control information is to be transmitted via a second signal.

2. The method of claim 1, further comprising:
transmitting the access control information to the at least one wireless communication device based at least partially on the indicator, wherein
the access control information includes information for controlling access of the at least one wireless communication device into a network associated with the wireless communication node, and
the access is controlled by at least one of: an application of the at least one wireless communication device, or a service of the at least one wireless communication device.

3. The method of claim 1, wherein the configuration includes information about at least one of:
availability of the access control information;
at least one manner for transmitting the access control information; or
at least one condition for the at least one wireless communication device to obtain the access control information.

4. The method of claim 3, wherein the at least one manner includes at least one of:
transmitting at least part of the access control information via a remaining minimum system information (RMSI) message;
transmitting at least part of the access control information via an other system information (OSI) message;
transmitting at least part of the access control information via an on demand mode OSI; or
transmitting at least part of the access control information via a dedicated radio resource control (RRC) message.

5. The method of claim 3, wherein the at least one condition includes at least one of:
a first condition for the at least one wireless communication device to enter a connected state to obtain at least part of the access control information;
a second condition for the at least one wireless communication device to enter an inactive state to obtain at least part of the access control information; or
a third condition for the at least one wireless communication device to enter an idle state to obtain at least part of the access control information.

6. The method of claim 1, wherein the indicator is transmitted via at least one of:
a remaining minimum system information (RMSI) message;
an other system information (OSI) message;
a paging message; or
a dedicated radio resource control (RRC) message.

7. The method of claim 1, wherein the first portion of the access control information includes at least one of:
at least one access control criterion that is predetermined to be most important access control information according to a protocol; or
critical access control information to a cell based on a predetermined maximum number of access control criteria allowed for transmission via the first signal in the cell.

8. The method of claim 1, further comprising:
transmitting the second portion of the access control information via the second signal, wherein the second signal is determined based on at least one of: a predetermined protocol or the configuration indicated by the indicator.

9. The method of claim 8, further comprising receiving a request for the second portion from the at least one wireless communication device, wherein:
the request is generated by one of the at least one wireless communication device based on the indicator; and
the second portion is transmitted in response to the request.

10. The method of claim 1, wherein:
the second signal comprises an additional indicator indicating whether a third portion of the access control information is to be transmitted via a third signal.

11. The method of claim 1, wherein:
the first portion comprises a common portion of access control information of a plurality of network operators sharing a network associated with the wireless communication node.

12. The method of claim 1, wherein the first portion and the second portion include different access control information based on at least one of:
an access identity of each of the at least one wireless communication device; or
an access category of each application or service under access control of the wireless communication node.

13. A method performed by a wireless communication device, the method comprising:
receiving an indicator from a wireless communication node, wherein
the indicator indicates a configuration of access control information related to the wireless communication device,
the indicator and at least a first portion of the access control information are received via a first signal, and
the indicator indicates whether a second portion of the access control information is to be transmitted by the wireless communication node via a second signal.

14. The method of claim 13, further comprising:
receiving the access control information from the wireless communication node device based at least partially on the indicator, wherein
the access control information includes information for controlling access of the wireless communication device into a network associated with the wireless communication node, and
the access is controlled by at least one of: an application of the wireless communication device, or a service of the wireless communication device.

15. The method of claim 13, wherein the configuration includes information about at least one of:
availability of the access control information;
at least one manner for the wireless communication device to obtain the access control information; or
at least one condition for the wireless communication device to obtain the access control information.

16. The method of claim 15, wherein the at least one manner includes at least one of:
obtaining at least part of the access control information via a remaining minimum system information (RMSI) message;
obtaining at least part of the access control information via an other system information (OSI) message;
obtaining at least part of the access control information via an on demand mode OSI; or
obtaining at least part of the access control information via a dedicated radio resource control (RRC) message.

17. The method of claim 15, wherein the at least one condition includes at least one of:

a first condition for the wireless communication device to enter a connected state to obtain at least part of the access control information;
a second condition for the wireless communication device to enter an inactive state to obtain at least part of the access control information; or
a third condition for the wireless communication device to enter an idle state to obtain at least part of the access control information.

18. The method of claim 13, wherein the indicator is received via at least one of:
a remaining minimum system information (RMSI) message;
an other system information (OSI) message;
a paging message; or
a dedicated radio resource control (RRC) message.

* * * * *